US012338981B2

(12) United States Patent
Huang et al.

(10) Patent No.: US 12,338,981 B2
(45) Date of Patent: Jun. 24, 2025

(54) DECORATIVE LAMP CONTROLLER

(71) Applicant: Changzhou Jutai Electronic Co., Ltd., Jiangsu (CN)

(72) Inventors: Wei Huang, Jiangsu (CN); Chengqian Pan, Jiangsu (CN); Bin Chen, Jiangsu (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 418 days.

(21) Appl. No.: 17/972,335

(22) Filed: Oct. 24, 2022

(65) Prior Publication Data

US 2024/0068649 A1 Feb. 29, 2024

(30) Foreign Application Priority Data

Aug. 23, 2022 (CN) ......................... 202222217958.9
Sep. 30, 2022 (CN) ......................... 202222614998.7

(51) Int. Cl.
*F21V 23/00* (2015.01)
*F21V 23/06* (2006.01)

(52) U.S. Cl.
CPC ............ *F21V 23/008* (2013.01); *F21V 23/06* (2013.01); *F21V 23/006* (2013.01)

(58) Field of Classification Search
CPC ....... F21V 23/008; F21V 23/06; F21V 23/006
See application file for complete search history.

(56) References Cited

U.S. PATENT DOCUMENTS

| | | | | |
|---|---|---|---|---|
| 8,337,250 | B1 * | 12/2012 | Yang | H01R 13/112 439/620.22 |
| 11,692,679 | B1 * | 7/2023 | Yang | F21S 4/10 362/217.01 |
| 2004/0027831 | A1 * | 2/2004 | Huang | F21S 10/06 362/363 |
| 2019/0094935 | A1 * | 3/2019 | Ng | G06F 13/4282 |
| 2021/0204419 | A1 * | 7/2021 | Yu | H01R 31/065 |
| 2023/0146438 | A1 * | 5/2023 | Huang | F21V 23/007 315/307 |
| 2024/0084982 | A1 * | 3/2024 | Xiong | H01R 24/60 |

* cited by examiner

*Primary Examiner* — Christopher E Dunay

(57) ABSTRACT

A lamp controller, comprising a circuit board, a main housing, a plug-in socket and an output plug-in component, wherein the main housing consists of an upper housing and a lower housing, the upper housing and/or the lower housing are provided with cavities, after the upper housing and the lower housing are combined, an accommodating cavity for assembling the circuit board is formed between the upper housing and the lower housing, the axial direction of the plug-in socket is not parallel to the longitudinal direction of the main housing, and the output plug-in component is fixed with the plug-in socket, wherein the controller further comprises an output connecting terminal, the output connecting terminal is fixed on the circuit board, the circuit board is provided with a yielding opening, a part of the output plug-in component is located in the cavity of the upper housing or the lower housing.

9 Claims, 22 Drawing Sheets

DECORATIVE LAMP CONTROLLER

CROSS-REFERENCE TO RELATED APPLICATIONS

This application claims priorities from the Chinese patent applications 2022222179589 filed Aug. 23, 2022, and 2022226149987 filed Sep. 30, 2022, the content of which are incorporated herein in the entirety by reference.

TECHNICAL FIELD

The present disclosure relates to a lamp controller.

BACKGROUND

Because of its various shapes and flashing lights, festive string lights have lighting decorative effects at night, and are also the first choice for people to add festive atmosphere in festivals. The above lighting decoration effect sends a control signal with a duty ratio to an LED lamp through a controller, and the control signal makes the LED lamp generate various flashing effects.

As shown in FIG. 1, the first existing lamp controller consists of a housing and a circuit board 1. The circuit board 1 is provided with a power supply circuit and a control unit. The housing comprises a main housing 2 and an end cap 3. One end of the main housing 2 is closed, and the other end thereof is provided with an opening. The main housing 2 is provided with an accommodating cavity. One end of the main housing 2 is fixed with a conductive component 4 connected with the electric supply. One end of the conductive component 4 is located inside the accommodating cavity of the main housing 2. The circuit board 1 is installed in the accommodating cavity of the main housing 2. The circuit board 1 is connected with the conductive component 4. The circuit board 1 is provided with an output connecting terminal 5. The end cap 3 is provided with a plug-in socket 6 for connecting LED lamps. The plug-in socket 6 is provided with an output plug-in component 7. When the end cap 3 covers the main housing 2, the output plug-in component 7 is inserted into and passes through the output connecting terminal 5.

The installation sequence of the first LED lamp controller described above is as follows: first, the circuit board 1 is inserted into the accommodating cavity of the main housing 2 along the axial direction X of the main housing 2, and then the end cap 3 is covered. When the end cap 3 covers the housing 2, the output plug-in component 7 is inserted into and passes through the output connecting terminal 5 along the axial direction X of the output connecting terminal 5, and finally the end cap 3 and the main housing 2 are sealed by ultrasonic waves.

In the first LED lamp controller described above, the main housing 2 and the conductive component 4 therein are integrally molded by injection molding, and the main housing 2 does not need to be divided into several parts. Moreover, the plug-in socket 6 is not on the main housing 2, but on the end cap 3, that is, the plug-in socket 6 is separated from the main housing. Therefore, it is easy for the output plug-in component 7 to be plugged with the output connecting terminal 5 during assembly.

As shown in FIG. 2, the existing second lamp controller comprises a circuit board 1, a main housing 2, a plug-in socket 6, an output plug-in component 7, a connecting wire 7*a*, and a power connecting terminal 9. The circuit board 1 is not provided with a controller. The circuit board 1 of the controller has no power circuit, and the power supply is provided by an external independent power supply (not shown). The controller without power circuit is also referred to as an independent controller. The main housing 2 consists of an upper housing 10 and a lower housing 11 with a cavity 12. After the upper housing 10 and the lower housing 11 are combined, an accommodating cavity is formed between the upper housing 10 and the lower housing 11. The circuit board 1 is located in the accommodating cavity. One end of the plug-in socket 6 is provided with a clamping part 8. The upper housing 10 and the lower housing 11 are provided with a first neck 13, respectively. After the clamping part 8 is fitted with the first neck 13, a part of the clamping part 8 is located in the cavity 12. The output plug-in component 7 is fixed on the plug-in socket 6. One end of the output plug-in component 7 is connected with one end of the connecting wire 7*a*, and the other end of the connecting wire 7*a* is electrically connected with the circuit board 1. The upper housing 10 and the lower housing 11 are provided with a second neck 14, respectively. The power connecting terminal 9 is fitted with the second neck 14. One end of the power connecting terminal 9 is electrically connected with the circuit board 1, and the other end of the power connecting terminal 9 is connected with an external independent power supply.

The installation sequence of the second LED lamp controller described above is as follows: first, the circuit board is placed in the cavity of the upper housing 10, the clamping part 8 of the plug-in socket 6 is clamped into the first neck 13 of the upper housing 10, the power connecting terminal 9 is fitted with the second neck 14 of the upper housing 10, the connecting wire 7*a* is welded with the circuit board 1, and one end of the power connecting terminal 9 is welded with the circuit board 1.

The second LED lamp controller described above needs to weld the connecting wire 7*a* with the circuit board 1 during assembly, which has the disadvantage of time-consuming assembly. Welding materials are also required for welding, so that the second LED lamp controller also has the disadvantage of high cost. In addition, the existing clamping part 8 is circular, and the first neck 13 is also circular. Therefore, after installation, the clamping part 8 rotates with respect to the housing under the circumferential force, which will easily damage the welding parts between the connecting wire 7*a* and the circuit board 1.

SUMMARY

The present disclosure provides a lamp controller, which can improve the assembly efficiency.

A lamp controller, comprising a circuit board, a main housing, a plug-in socket and an output plug-in component, wherein the main housing consists of an upper housing and a lower housing, the upper housing and/or the lower housing are provided with cavities, after the upper housing and the lower housing are combined, an accommodating cavity for assembling the circuit board is formed between the upper housing and the lower housing, the axial direction of the plug-in socket is not parallel to the longitudinal direction of the main housing, and the output plug-in component is fixed with the plug-in socket, wherein the controller further comprises an output connecting terminal, the output connecting terminal is fixed on the circuit board, the circuit board is provided with a yielding opening, a part of the output plug-in component is located in the cavity of the upper housing or the lower housing, after the plug-in socket is fixed with the main housing, when the circuit board is assembled into the cavity of the upper housing or the lower housing, the output connecting terminal is connected with the output plug-in component again after the end of the output plug-in component passes through the yielding opening on the circuit board.

The present disclosure is an improvement based on the second lamp controller in the background, which is combined with the state of fixing the plug-in socket and the main housing. After the output connecting terminal is added on the circuit board, the output connecting terminal is connected with the output plug-in component during assembly. This structure avoids the welding of the output connecting terminal and the output plug-in component, thus improving the assembly efficiency.

DETAILED DESCRIPTION OF THE EMBODIMENTS

A First Embodiment

Figure 1:
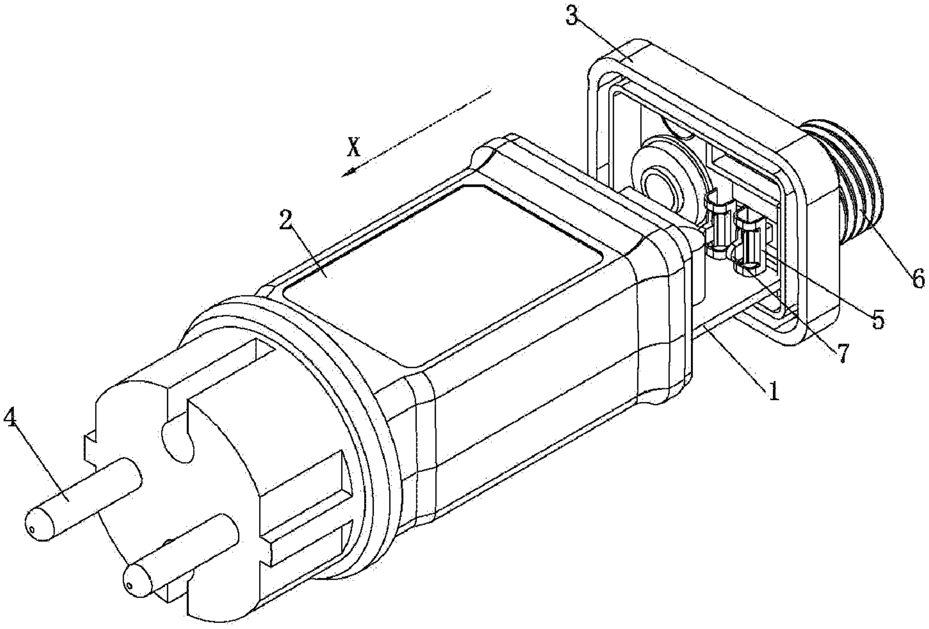
FIG. 1 is an explosive diagram of a first lamp controller in the prior art.
Figure 2:
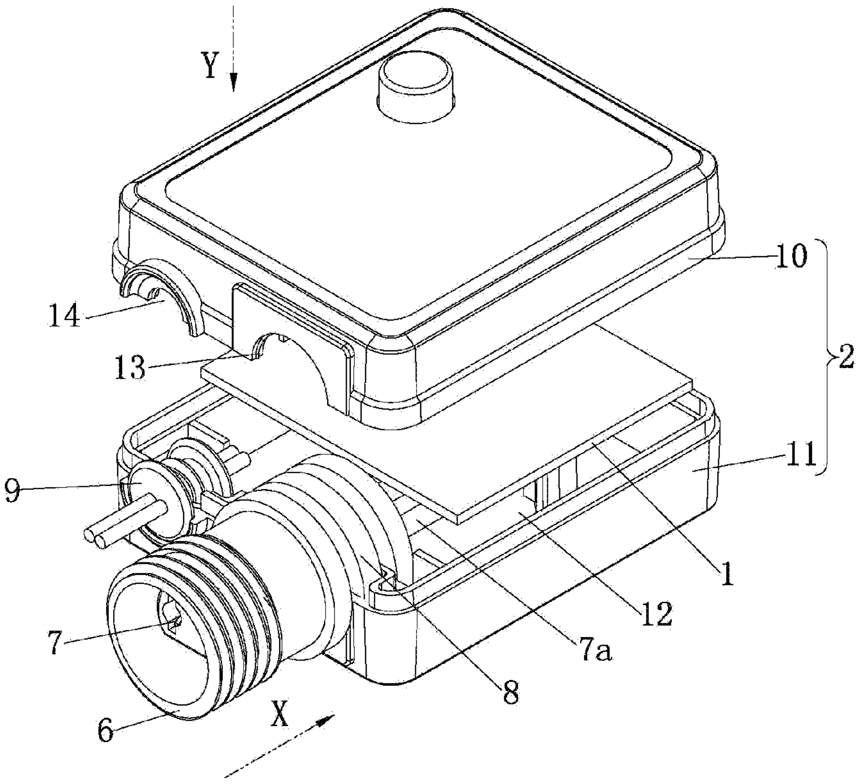
FIG. 2 is an explosive diagram of a second lamp controller in the prior art.

As shown in FIGS. 3A to 3E, the lamp controller of this embodiment comprises a circuit board 1, a main housing 2, a plug-in socket 6, and an output plug-in component 7. The main housing 2 consists of an upper housing 10 and a lower housing 11. In this embodiment, the circuit board 1 is provided with a control unit. The control unit consists of one or more circuits. The control unit controls the output signal according to the input signal, so that the lamp (such as an LED string lamp) connected to the output plug-in component 7 produces different lighting effects, such as different brightness, flashing speeds, color temperatures, etc.

The upper housing 10 and/or the lower housing 11 are provided with cavities 12. In this embodiment, preferably, the upper housing 10 and the lower housing 11 are both provided with cavities 12. After the upper housing 10 and the lower housing 11 are combined, an accommodating cavity for assembling the circuit board 1 is formed between the upper housing 10 and the lower housing 11, that is, the accommodating cavity consists of the cavity 12 on the upper housing 10 and the cavity 12 on the lower housing 11.

The plug-in socket 6 is fixed with the main housing 2. In this embodiment, preferably, the plug-in socket 6 and the upper housing 10 or the lower housing 11 are integrally formed, and the plug-in socket 6 and the upper housing 10 or the lower housing 11 are preferably integrally molded by injection molding. This structure does not need to separately clamp the plug-in socket 6 with the upper housing 10 or the lower housing 11 during subsequent assembly, which has the advantage of time-saving assembly. Furthermore, the structure that the plug-in socket 6 and the upper housing 10 or the lower housing 11 are integrally formed also has the advantages of good strength and excellent water resistance, which also avoids the unfavorable factors that the plug-in socket 6 rotates with respect to the main housing 2 to damage the connection between the output plug-in component 7 and the output connecting terminal 5 at the same time.

The axial direction X of the plug-in socket 6 is not parallel to the longitudinal direction Y of the main housing 2. In this embodiment, an included angle is formed between the axial direction X of the plug-in socket 6 and the longitudinal direction Y of the main housing 2, and the included angle is preferably 90 degrees.

In this embodiment, there are two output plug-in components 7. The two output plug-in components 7 can be connected with two-wire and two-channel LED lamps, such as the two-wire and two-channel string lamps disclosed in CN203523098U.

The output plug-in component 7 is fixed to the plug-in socket 6. Preferably, the plug-in socket 6 is provided with an assembly hole. One end of the output plug-in component 7 passes through the assembly hole, and the other end of the output plug-in component 7 fits inside the assembly hole, so that the plug-in socket 6 wraps a part of the output plug-in socket 7, the output plug-in socket 7 has a Y-shaped structure, and the other end of the output plug-in component 7 has an opening into which the input end of the lamp is inserted.

The lamp controller of this embodiment further comprises an output connecting terminal 5. The output connecting terminal 5 is fixed at the output end of the circuit board 1. The output connecting terminal 5 is welded to the output end of the control unit on the circuit board 1. The circuit board 1 is provided with a yielding opening 1*a*. One end of the output plug-in component 7 is located in the cavity 12 of the upper housing 10 or the lower housing 11. After the plug-in socket 6 is fixed with the main housing 2, when the circuit board 1 is assembled into the cavity 12 of the upper housing 10 or the lower housing 11, the output connecting terminal 5 is connected with the output plug-in component 7 after one end of the output plug-in component 7 passes through the yielding opening 1*a* of the circuit board 1.

Figure 3A:
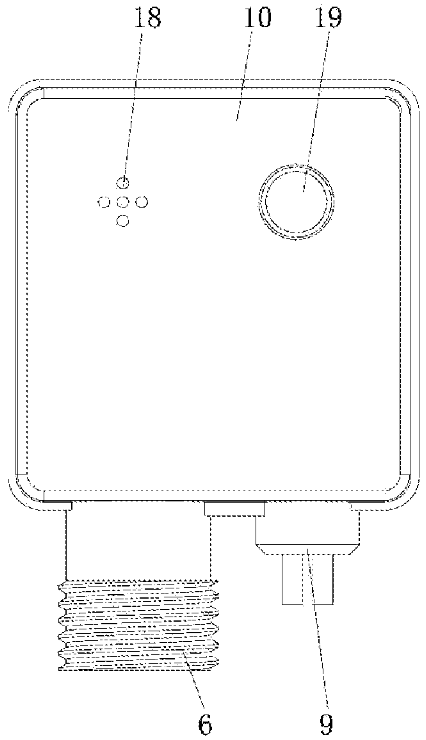
FIG. 3A is a structural diagram of a first embodiment of a lamp controller according to the present disclosure.
Figure 3B:
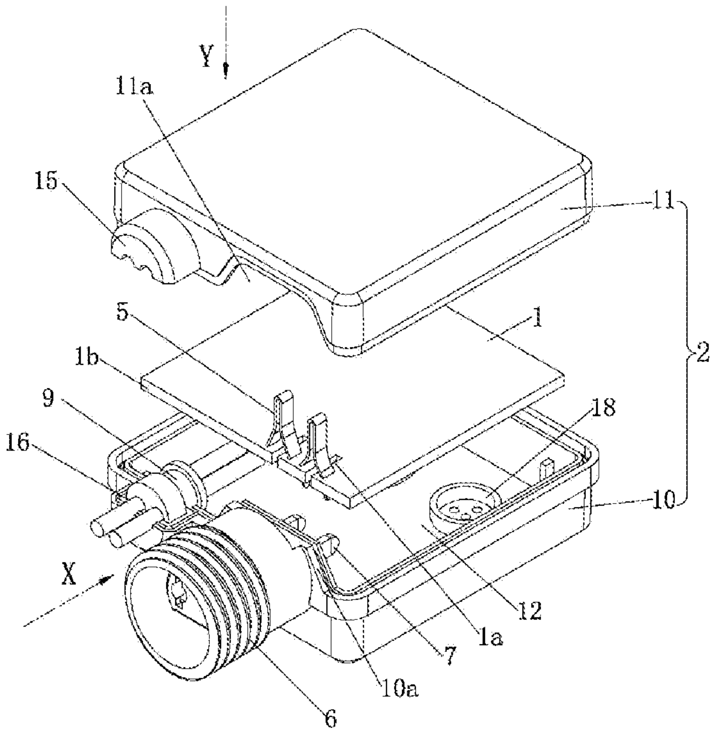
FIG. 3B is an explosive diagram of a lamp controller according to the present disclosure.
Figure 3C:
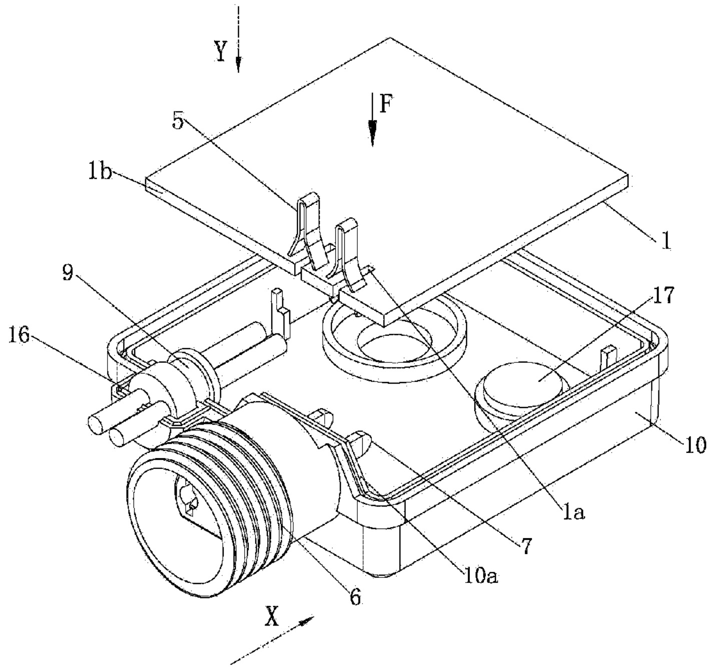
FIG. 3C is a schematic diagram after a lower housing is hidden on the basis of FIG. 3B.
Figure 3D:
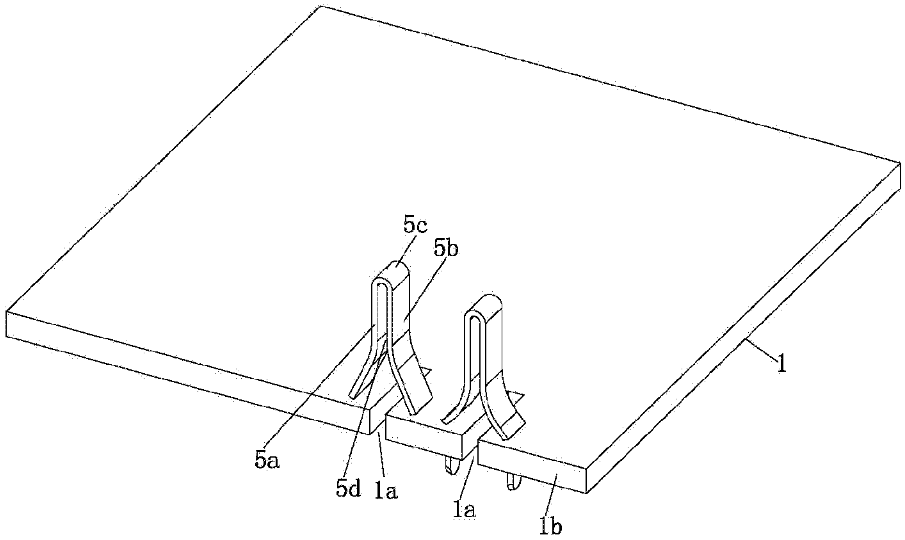
FIG. 3D is an assembly diagram of a circuit board and an output connecting terminal according to the present disclosure.
Figure 3E:
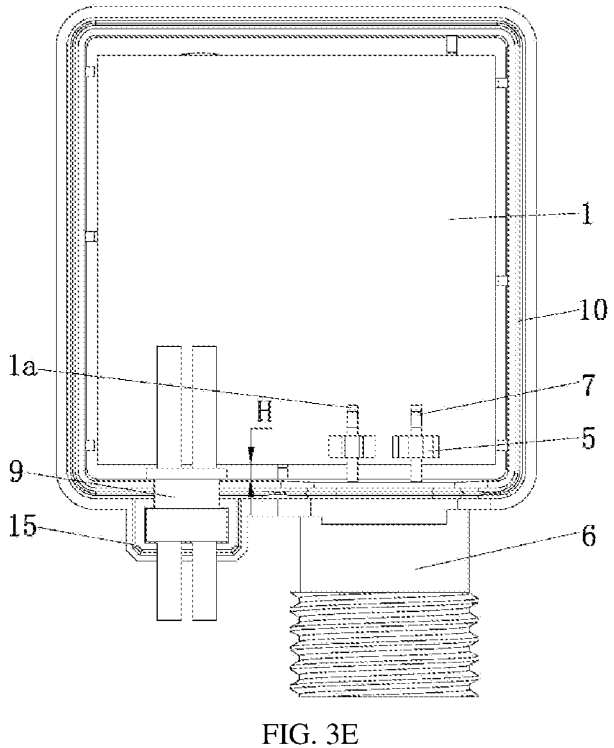
FIG. 3E is an assembly diagram of a circuit board and an upper housing according to the present disclosure.

Since the second lamp controller in the background is welded with the circuit board 1 and the output plug-in component 7 through the connecting wires 7*a*, respectively, the lamp controller in this embodiment is an improvement based on the second lamp controller in the background. Therefore, in order to improve the assembly efficiency, in this embodiment, after the connecting wire 7*a* in the prior art is eliminated, an output connecting terminal 5 is added to the circuit board 1. However, in this embodiment, the plug-in socket 6 is improved into a structure integrally formed with the upper housing 10 or the lower housing 11, and the output plug-in component 7 is integrally formed with the plug-in socket 6 by injection molding. Therefore, the output plug-in component 7 will not move during assembly. At this time, if the circuit board 1 is assembled in the cavity 12 on the upper housing 10 or the lower housing 11, the output plug-in component 7 will inevitably hinder the circuit board 1. Therefore, this embodiment has been improved. That is, the circuit board 1 is provided with a yielding opening 1*a*. When the circuit board 1 moves along the longitudinal direction Y of the upper housing 10 or the lower housing 11, so that the circuit board 1 is assembled into the cavity 12 of the upper housing 10 or the lower housing 11, one end of the output plug-in component 7 applies an acting force F in the longitudinal direction Y to the circuit board 1 or the output connecting terminal 5 (as shown in FIG. 3C) after passing through the yielding opening 1*a* on the circuit board 1, so that the output connecting terminal 5 is connected with the output plug-in component 7.

It can be seen from the above that, in this embodiment, in order to improve the assembly efficiency, on the basis of the main housing 2 consisting of the upper housing 10 and the lower housing 11, the circuit board 1 is provided with a yielding opening 1*a* to yield the end of the output plug-in component 7, so that the output connecting terminal 5 is connected with the output plug-in component 7 for transmitting electrical signals.

Compared with the first lamp controller in the background, although both lamp controllers in this embodiment have the output connecting terminal 5 and the output plug-in component 7, this embodiment is different from the first lamp controller in the background in the above structure, and the most important difference is that the output connecting terminal 5 moves along the longitudinal direction Y of the upper housing 10 or the lower housing 11 when the acting force F is applied, so that the output connecting terminal 5 and the output plug-in component 7 are plugged or clamped. However, the first lamp controller in the background allows the output plug-in component 7 to be inserted into and pass through the output connecting terminal 5 along the transverse direction of the output connecting terminal 5 during assembly. Therefore, this embodiment is different from the first lamp controller in the background in assembly due to their different structural designs.

In this embodiment, according to the length of the yielding opening 1*a*, the following two manners are selected so that the output plug-in component 7 passes through the yielding opening 1*a*.

(1) When the circuit board 1 is assembled into the cavity 12 of the upper housing 10 or the lower housing 11, the circuit board 1 moves along the longitudinal direction Y of the upper housing 10 or the lower housing 11. In the process that the circuit board 1 moves along the longitudinal direction Y, one end of the output plug-in component 7 passes through the yielding opening 1*a*. In this manner, the required condition is that the length of the yielding opening 1*a* is greater than or equal to the length of the part of the output plug-in component 7 exposed to the outside of the plug-in socket 6, so that the output plug-in component 7 will not block the circuit board 1 when the circuit board 1 moves in the axial direction X along the longitudinal direction Y of the upper housing 10 or the lower housing 11.

(2) When the length of the yielding opening 1*a* is shorter than the length of the part of the output plug-in component 7 exposed to the outside of the plug-in socket 6, first, the circuit board 1 is inclined to the upper housing 10 or the lower housing 11 and moves to connect the output connecting terminal 5 with the output plug-in component 7. In the case that the yielding opening 1*a* and the output plug-in component 7 have the length relationship described above, if the circuit board 1 continues to move along the longitudinal direction Y of the upper housing 10 or the lower housing 11, the output plug-in component 7 and the circuit board 1 will be inevitably blocked and cannot be installed. Therefore, the circuit board 1 is inclined to the upper housing 10 or the lower housing 11 and moves, so that the yielding opening 1*a* is inclined to the output plug-in component 7 to prevent the output plug-in component 7 from blocking the circuit board 1, and the output connecting terminal 5 is connected with the output plug-in component 7.

In this embodiment, the output connecting terminal 5 comprises a first clip 5*a*, a second clip 5*b*, and a connecting part 5*c*. One end of the first clip 5*a* is connected with one end of the connecting part 5*c*, and the other end of the connecting part 5*c* is connected with one end of the second clip 5*b*. A clearance space 5*d* fitted with the output plug-in component 7 is formed between the first clip 5*a* and the second clip 5*b*. The other end of the first clip 5*a* is fixed with the circuit board 1 and located at one side of the yielding opening 1*a*.

The other end of the second clip 5*b* is fixed with the circuit board 1 and located at the other side of the yielding opening 1*a*. The clearance space 5*d* corresponds to the yielding opening 1*a*. The output plug-in component 7 generates expansion force on the first clip 5*a* and the second clip 5*b* after being inserted into the clearance space 5*d*.

Preferably, the other ends of the first clip 5*a* and the second clip 5*b* are bent to the outside of the clearance space 5*d*, so that the opening of the output connecting terminal 5 is tapered or splayed, which is beneficial for the output plug-in component 7 to enter the clearance space 5*d*. In addition, the output connecting terminal 5 may also use a U-shaped structure.

The output connecting terminal 5 with the above structure has the characteristics of simple structure, low cost and convenient assembly.

The lamp controller of this embodiment further comprises a power connecting terminal 9. The upper housing 10 and/or the lower housing 11 are provided with a clamping component 15 located outside the cavity 12. The clamping component 15 is provided with a neck 16, and a part of the power connecting terminal 9 is fitted with the neck 16.

In this embodiment, there is no power circuit on the circuit board 1, and the power supply is provided by an external independent power supply (not shown). Therefore, the lamp controller of this embodiment is an independent controller by configuring the power connecting terminal 9 to connect the external power supply.

In this embodiment, for the first side 1*b* of the circuit board 1 adjacent to the power connecting terminal 9, the distance H between the first side 1*b* and the adjacent inner walls of the upper housing 10 or the lower housing 11 is less than 3 mm.

Because the clamping component 15 is located outside the cavity 12, the clamping component 15 does not occupy the clearance space of the cavity 12, so that the space in the cavity 12 is used for installing the circuit board 1. Therefore, the size of the circuit board 1 can be made larger than that of the circuit board in the second lamp controller in the background, which is beneficial to expanding the circuit structure and avoiding the crowding of electronic components on the circuit board 1.

In this embodiment, the upper housing 10 is integrally formed with a first convex part 10*a* located outside the cavity 12. The lower housing 11 is formed with a first fitting groove 11*a*. The first convex part 10*a* is located on the end face covering the lower housing 11. The first fitting groove 11*a* is located on the end face covering the upper housing 10. The first fitting groove 11*a* is fitted with the first convex part 10*a*, and the plug socket 6 is integrally formed with the convex part 10*a*.

The convex part 10*a* is integrally formed with the upper housing 10, and the plug-in socket 6 is integrally formed with the convex part 10*a*, which prevents a part of the plug-in socket 6 from being arranged in the cavity 12. In this way, the plug-in socket 6 in this embodiment does not need to be provided with a clamping part, which prevents the plug-in socket 6 from occupying the space of the cavity 12, and is beneficial to expanding the size of the circuit board 1.

In this embodiment, the circuit board 1 is provided with a voice control mode input unit 17 for receiving external ambient sound. The upper housing 10 or the lower housing 11 is provided with a channel 18 through which external ambient sound reaches the voice control mode input unit 17. The channel 18 is fitted with the voice control mode input unit 17. The area where the channel 18 is located is flush with the surface of the upper housing 10 or the lower housing 11, or is convex or concave.

In this embodiment, in addition to the voice control mode input unit 17, various modes, such as input of a key 19 and input of remote control signals, can be used. There may be a single mode or a combination of two or more modes. After these input modes are processed by the control unit on the circuit board 1, these input modes are all converted into control signals for changing the loaded lamp. The above input modes form the prior art, which will not be described in detail here.

The assembly process of the lamp controller of this embodiment is as follows. Since the first convex part 10*a* and the upper housing 10 are integrally molded by injection molding, and the plug-in socket 6 and the first convex part 10*a* are integrally molded by injection molding, the plug-in socket 6 and the output plug-in component 7 are in a state of not moving during the assembly. Therefore, during assembly, when the circuit board 1 first moves along the longitudinal direction Y of the upper housing 10 and enters the cavity 12 of the upper housing 10, after one end of the output plug-in component 7 passes through the yielding opening 1*a* of the circuit board 1, the output plug-in component 7 is passively inserted into the clearance space 5*d* of the output connecting terminal 5, so that the output plug-in component 7 and the output plug-in component 7 are plugged and fixed. Then, the power connecting terminal 9 is clamped into the neck 16 of the clamping component 15, and the end of the power connecting terminal 9 is welded with the power input part of the circuit board 1. Finally, the lower housing 11 and the upper housing 10 are combined, and the combining part of the lower housing 11 and the upper housing 10 is welded by ultrasonic waves.

The present disclosure is not limited to the above embodiments, but the first embodiment can also have the following modifications.

(a) The plug-in socket 6 uses the same structure as that of the plug-in socket 6 in the second lamp controller in the background, that is, the plug-in socket 6 is separated from the lower housing 11 or the upper housing 10. The assembly process of this structure is as follows: first, the clamping part 8 on the plug-in socket 6 is clamped and fixed with the upper housing 10, and the subsequent assembly process is the same as that in the first embodiment.

Figure 3F:
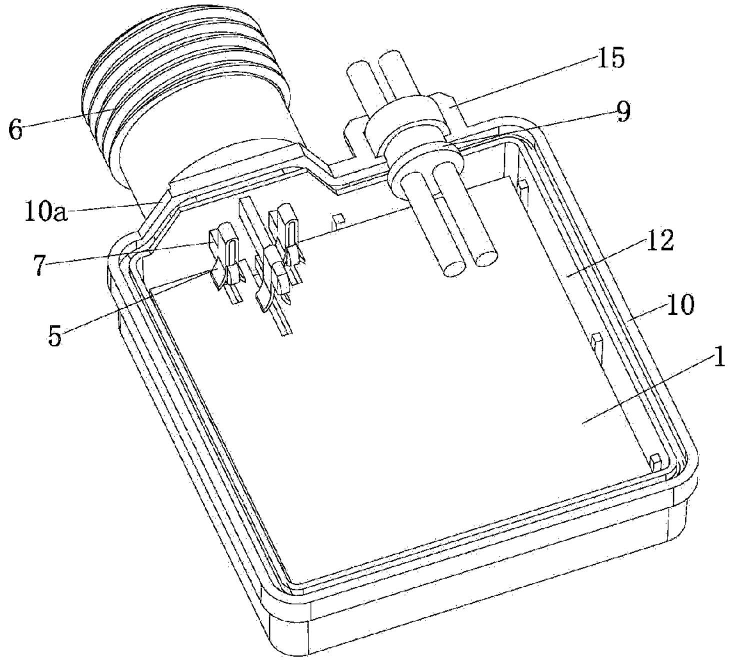
FIG. 3F is a schematic diagram of another lamp controller after a lower housing is hidden.
Figure 3G:
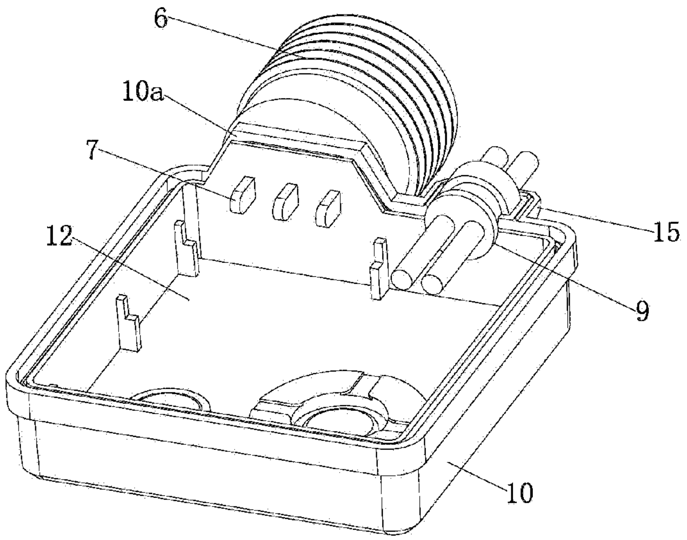
FIG. 3G is a schematic diagram of another lamp controller after a lower housing is hidden.

(b) As shown in FIG. 3F and FIG. 3G, there are three output plug-in components 7 provided on the plug-in socket 6, which are arranged in a triangle or a straight line. The plug-in socket 6 is provided with three output plug-in components 7, which can be connected to three-wire multi-channel lamps, such as three-wire four-channel lamps or three-wire point-control lamps. On the basis of expanding the number of load channels, the lamps have more combined lighting effects, and the lamplight effect is better.

Figure 3H:
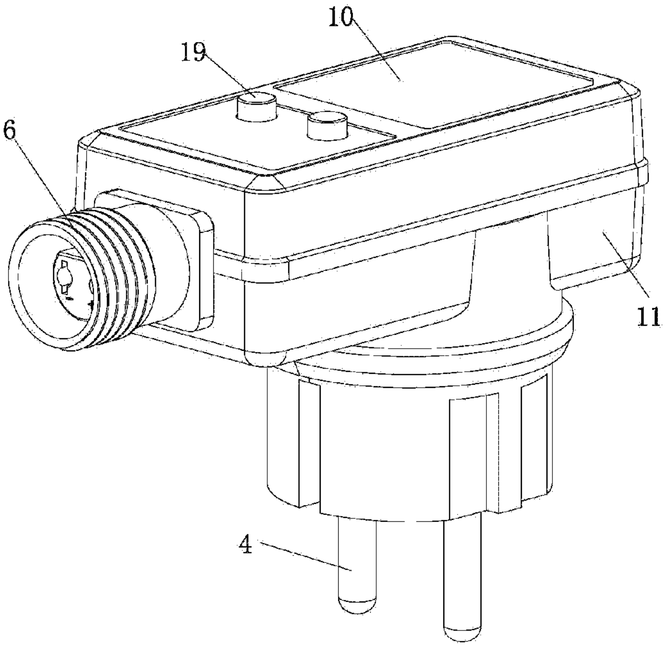
FIG. 3H is a schematic diagram of a lamp controller with a power circuit according to the present disclosure.

(c) As shown in FIG. 3H, the circuit board 1 is provided with a power supply circuit, and the lower housing 11 is provided with a conductive component 4 connected to the electric supply. The axial direction X of the conductive component 4 is parallel to the longitudinal direction Y of the lower housing 11. Therefore, the power supply connecting terminal 9 is no longer needed in this structure, and the rest parts are the same as those of the first embodiment, which will not be described in detail here.

A Second Embodiment

Figure 3I:
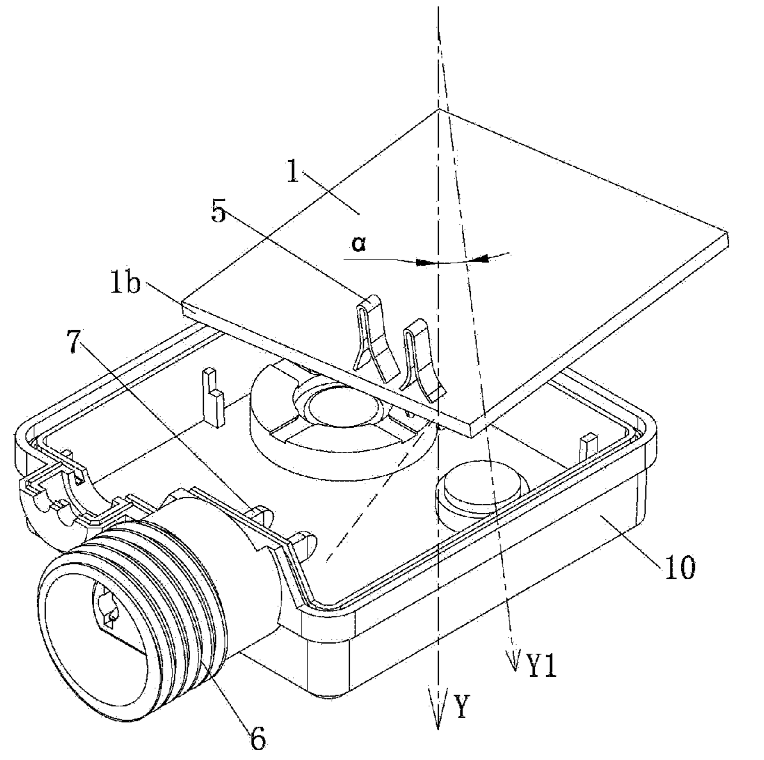
FIG. 3I is a schematic diagram of a second embodiment of a lamp controller according to the present disclosure.

When the plug-in socket 6 is fixed with the upper housing 10 or the lower housing 11 in the main housing 2, as shown in FIG. 3I, this embodiment is different from the first embodiment in that the circuit board 1 is inclined to the main housing 2 and moves, and the output connecting terminal 5 is connected with the output plug-in component 7.

For example, in this embodiment, after the included angle α is formed between the longitudinal direction Y1 of the circuit board 1 and the longitudinal direction Y of the upper housing 10 (Y direction is also the longitudinal direction of the main housing 2), first, the circuit board 1 is kept inclined and moves, the first side 1*b* is located between the output plug-in component 7 and the upper housing 10, and the end with the first side 1*b* is inserted into the gap between the output plug-in component 7 and the upper housing 10 in the state that the circuit board 1 is inclined to the upper housing 10. Then, the circuit board 1 is kept inclined and moves. For example, the movement can be a compound movement along the longitudinal direction Y of the main housing 2 and the axial direction of the plug-in socket 6, or a movement along the longitudinal direction Y of the main housing 2 alone, or a compound movement along the axial direction X of the plug-in socket 6 alone. Finally, the output connecting terminal 5 is connected with the output plug-in component 7.

The circuit board 1 in the second embodiment may not be provided with the yielding opening 1*a*.

A Third Embodiment

Figure 3J:
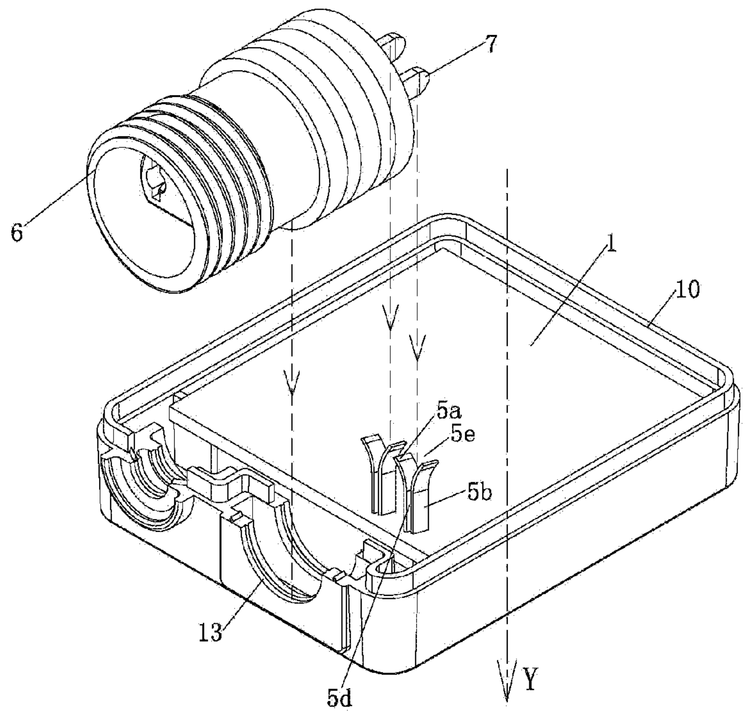
FIG. 3J is a schematic diagram of a third embodiment of a lamp controller according to the present disclosure.

As shown in FIG. 3J, the difference between this embodiment and the first embodiment is that after the circuit board 1 is assembled in the cavity 12 of the upper housing 10 or the lower housing 11, the plug-in socket 6 is fitted with the upper housing 10 along the longitudinal direction of the upper housing 10. The output plug-in component 7 is connected with the output connecting terminal 5. Alternatively, when the plug-in socket 6 is fitted with the lower housing 11 along the longitudinal direction of the lower housing 11, the output plug-in component 7 is connected with the output connecting terminal 5.

In this embodiment, preferably, the output connecting terminal 5 consists of a first clip 5*a* and a second clip 5*b*. A clearance space 5*d* fitted with the output plug-in component 7 is formed between the first clip 5*a* and the second clip 5*b*. One end of the first clip 5*a* and the second clip 5*b* is fixed to the circuit board 1. The other end of the first clip 5*a* and the second clip 5*b* is a free end. Therefore, an inserting opening 5*e* into which the output plug-in component 7 is inserted is formed between the other end of the first clip 5*a* and the other end of the second clip 5*b*.

In this embodiment, the plug-in socket 6 is separated from the main housing 2, which are not integrally molded by injection molding as in the first embodiment. Therefore, first, the circuit board 1 can be installed in the upper housing 10, and then the plug-in socket 6 can move in the direction indicated by the arrow on the dotted line in FIG. 3J. When the plug-in socket 6 is fitted with the first neck 13 in the upper housing 10, the output plug-in component 7 enters the clearance space 5*d* from the inserting opening 5*e*, so that the output plug-in component 7 and the output connecting terminal 5 are plugged.

The circuit board 1 in the third embodiment may not be provided with the yielding opening 1*a*.

A Fourth Embodiment

Figure 3K:
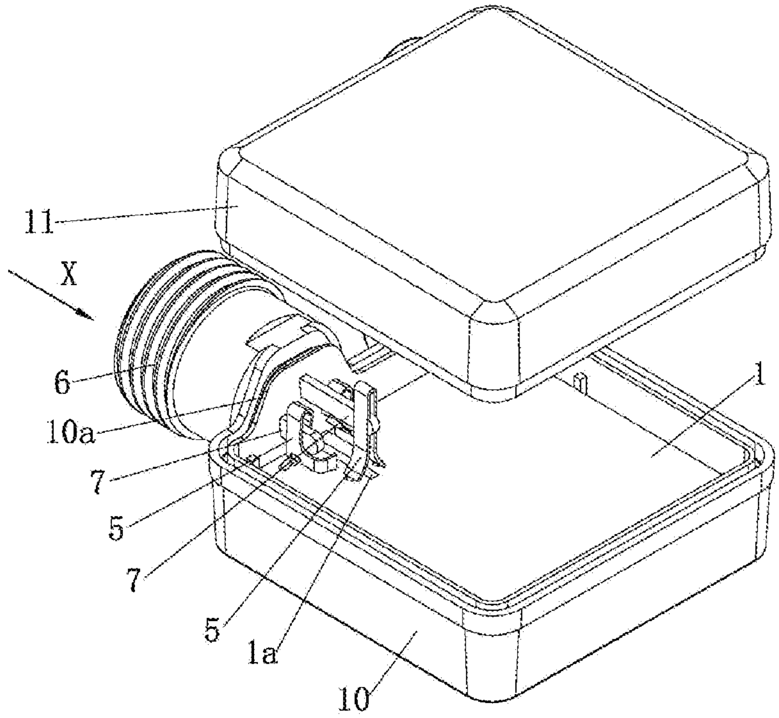
FIG. 3K is a schematic diagram of a fourth embodiment of a lamp controller according to the present disclosure.
Figure 3M:
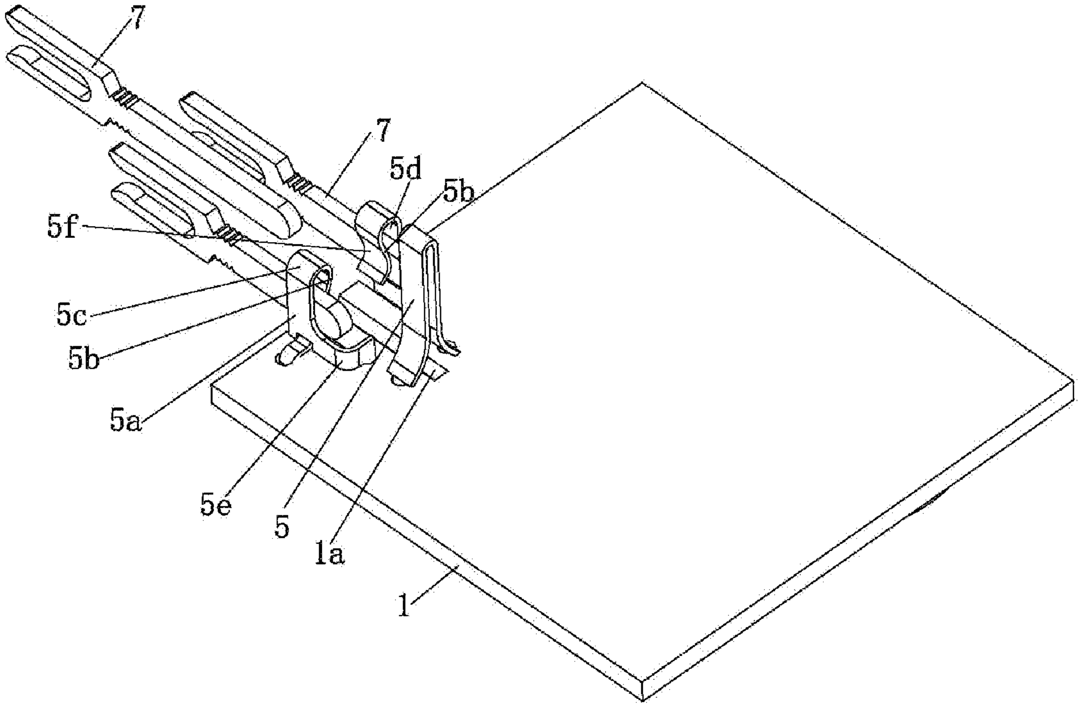
FIG. 3M is an assembly diagram of a circuit board and an output connecting terminal in FIG. 3K.
Figure 4A:
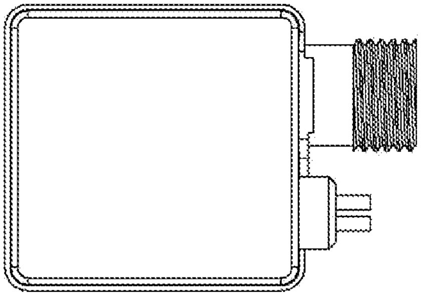
FIGS. 4A to 4F are regular hexahedron projection views of a first lamp controller according to the present disclosure.
Figure 4B:
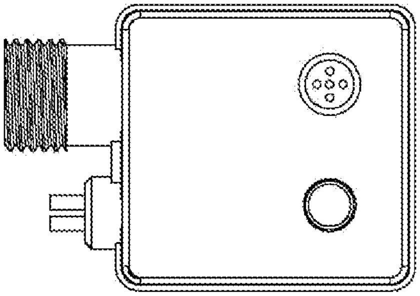
Figure 4C:
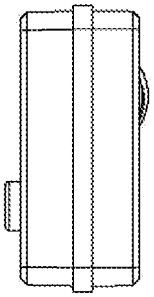
Figure 4D:
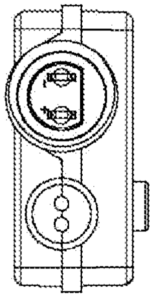
Figure 4E:
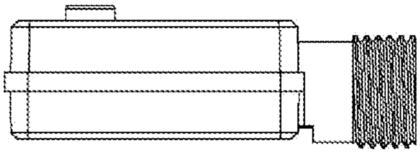
Figure 4F:
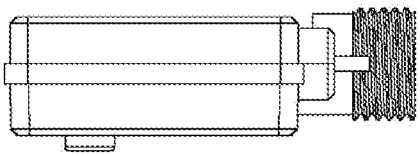
Figure 5A:
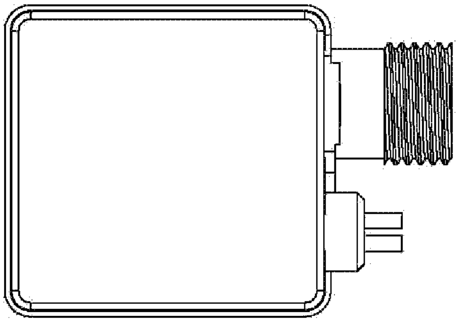
FIG. 5A to FIG. 5F are regular hexahedron projection views of a second lamp controller according to the present disclosure.
Figure 5B:
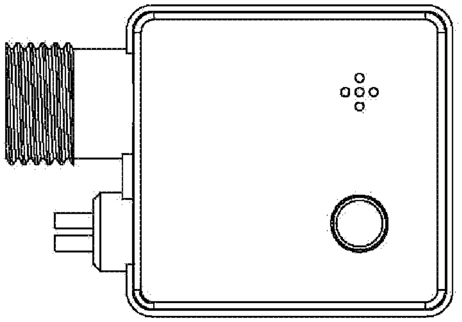
Figure 5C:
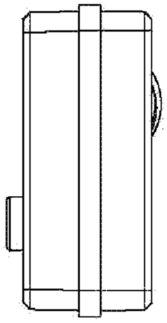
Figure 5D:
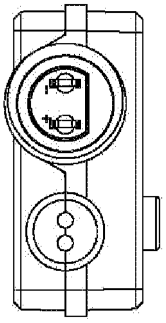
Figure 5E:
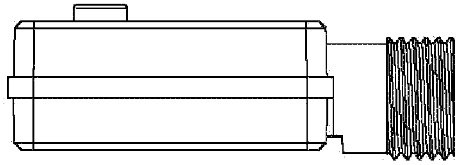
Figure 5F:
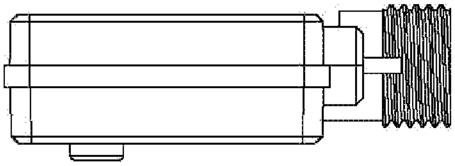
Figure 6A:
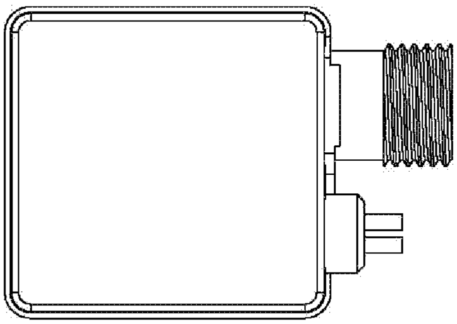
FIG. 6A to FIG. 6F are regular hexahedron projection views of a third lamp controller according to the present disclosure.
Figure 6B:
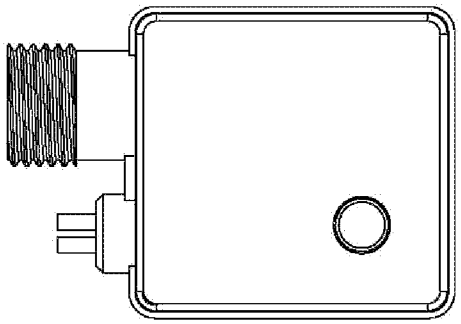
Figure 6C:
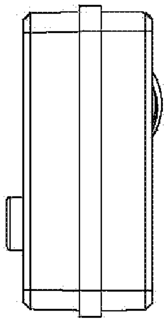
Figure 6D:
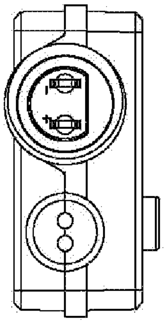
Figure 6E:
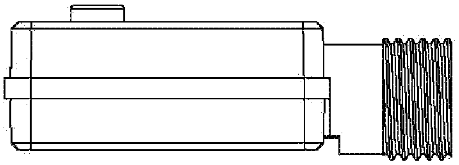
Figure 6F:
Figure 7A:
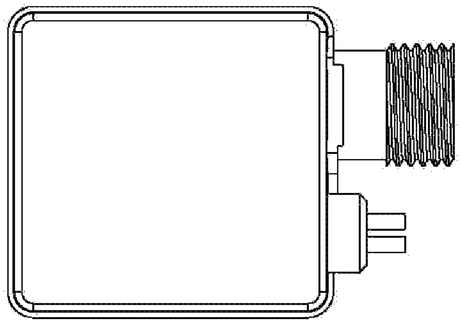
FIGS. 7A to 7F are regular hexahedron projection views of a fourth lamp controller according to the present disclosure.
Figure 7B:
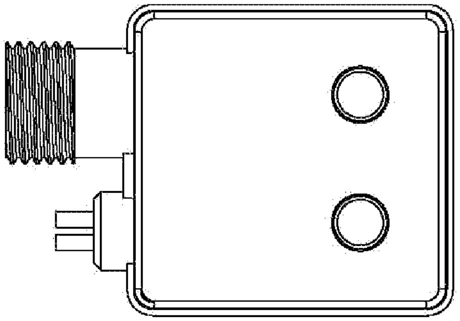
Figure 7C:
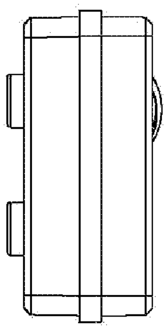
Figure 7D:
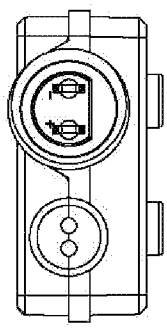
Figure 7E:
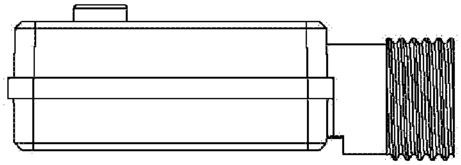
Figure 7F:
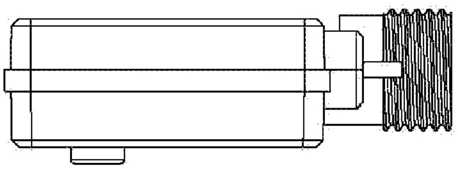
Figure 8A:
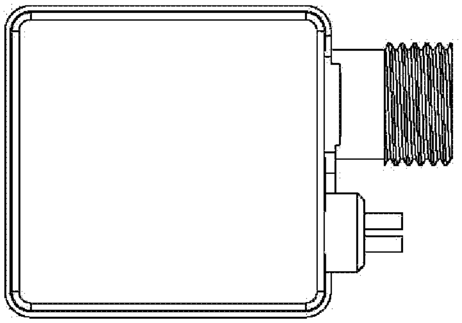
FIGS. 8A to 8F are the regular hexahedron projection views of a fifth lamp controller according to the present disclosure.
Figure 8B:
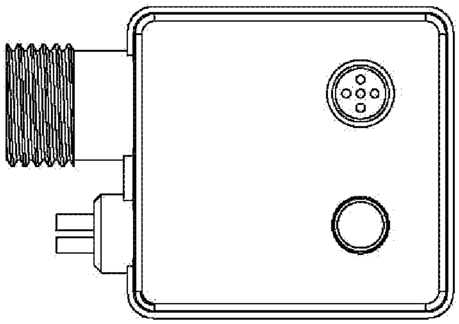
Figure 8C:
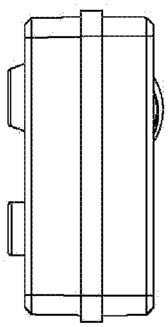
Figure 8D:
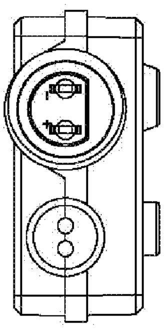
Figure 8E:
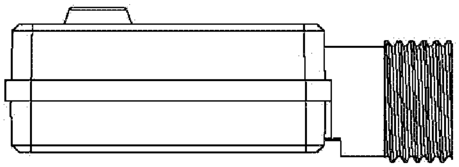
Figure 8F:
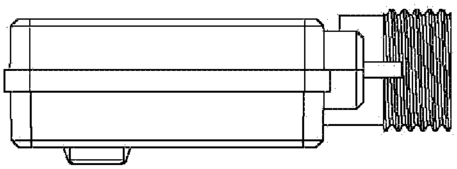
Figure 9A:
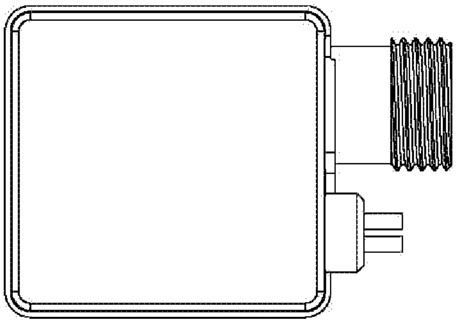
FIGS. 9A to 9F are regular hexahedron projection views of a sixth lamp controller according to the present disclosure.
Figure 9B:
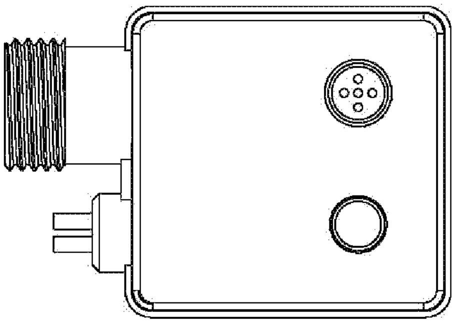
Figure 9C:
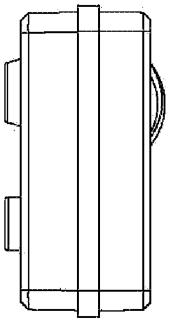
Figure 9D:
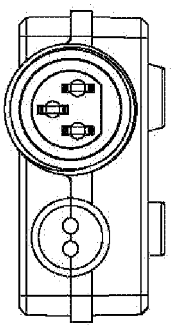
Figure 9E:
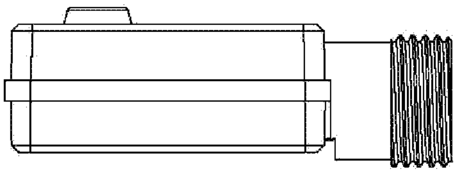
Figure 9F:
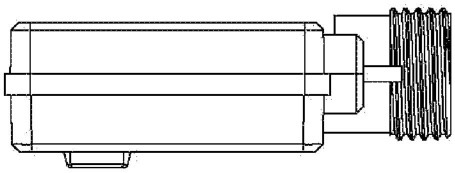
Figure 10A:
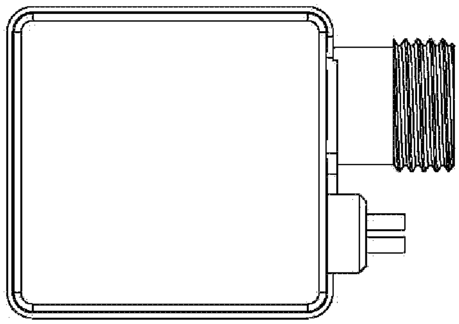
FIGS. 10A-10F are regular hexahedron projection views of a seventh lamp controller according to the present disclosure.
Figure 10B:
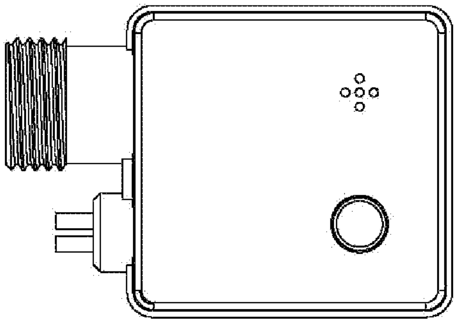
Figure 10C:
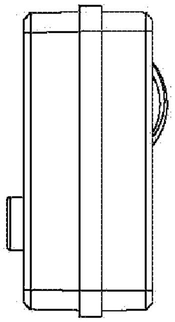
Figure 10D:
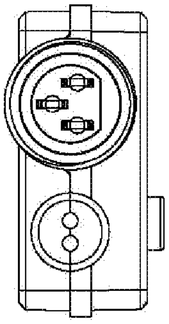
Figure 10E:
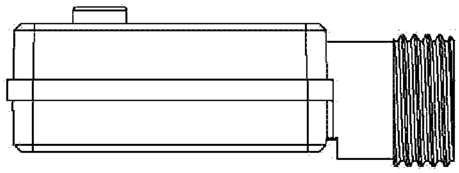
Figure 10F:
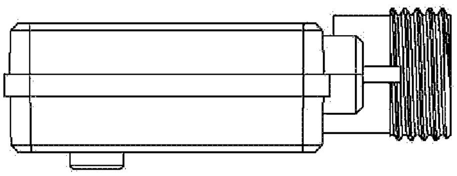
Figure 11A:
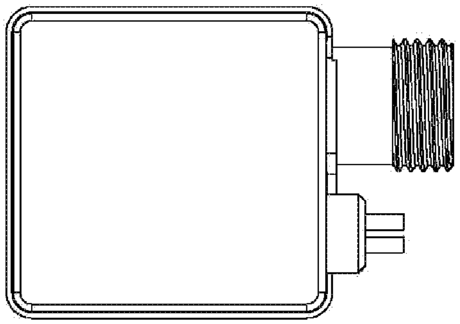
FIGS. 11A to 11F are regular hexahedron projection views of an eighth lamp controller according to the present disclosure.
Figure 11B:
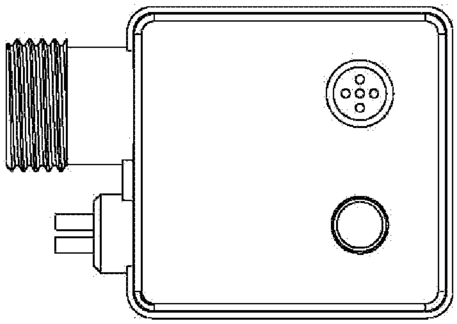
Figure 11C:
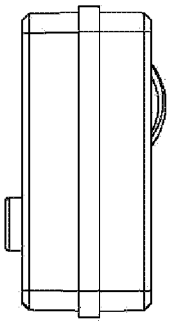
Figure 11D:
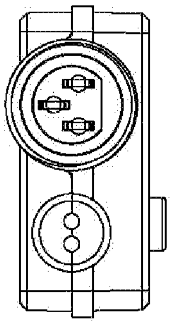
Figure 11E:
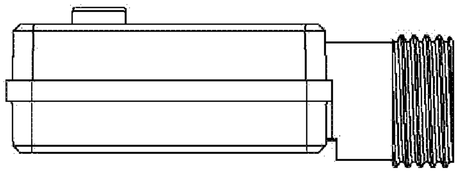
Figure 11F:
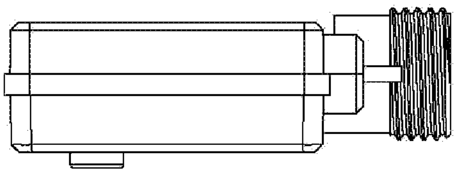
Figure 12A:
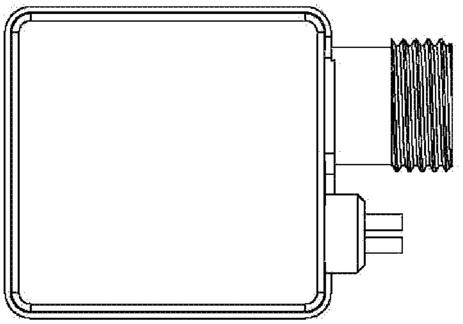
FIGS. 12A to 12F are regular hexahedron projection views of a ninth lamp controller according to the present disclosure.
Figure 12B:
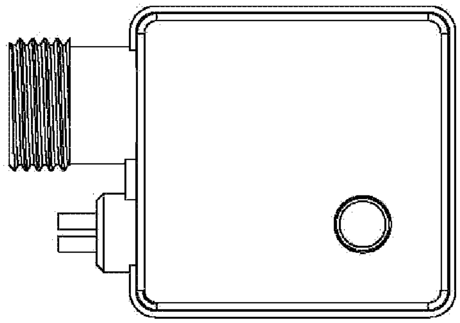
Figure 12C:
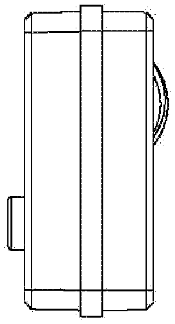
Figure 12D:
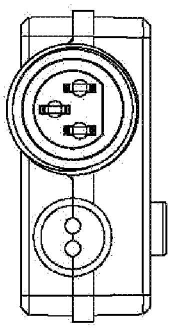
Figure 12E:
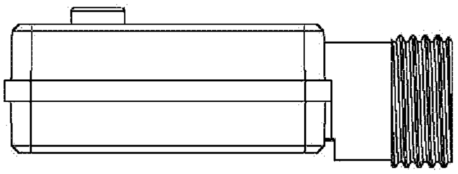
Figure 12F:
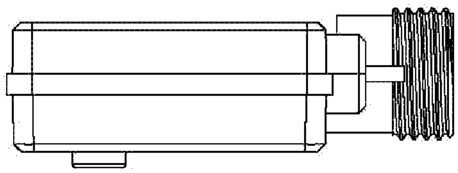
Figure 13A:
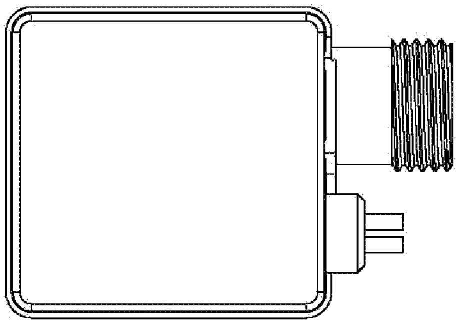
FIGS. 13A to 13F are regular hexahedron projection views of a tenth lamp controller according to the present disclosure.
Figure 13B:
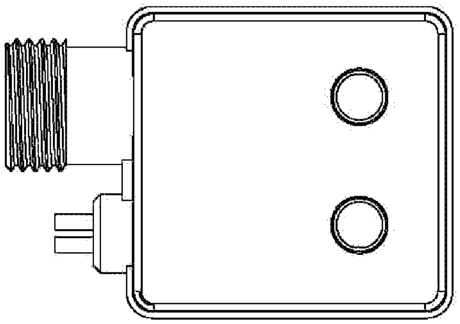
Figure 13C:
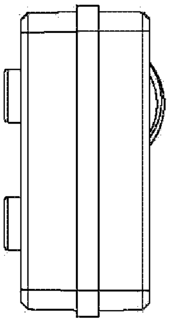
Figure 13D:
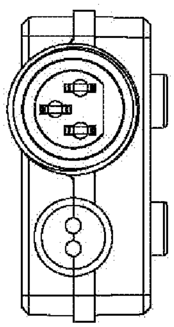
Figure 13E:
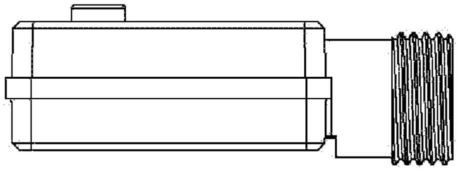
Figure 13F:
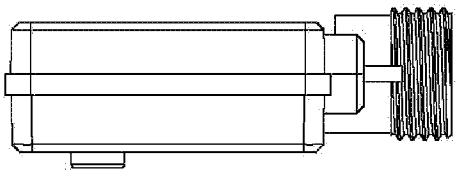
Figure 14A:
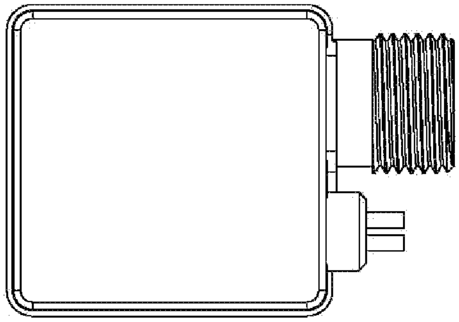
FIGS. 14A to 14F are regular hexahedron projection views of an eleventh lamp controller according to the present disclosure.
Figure 14B:
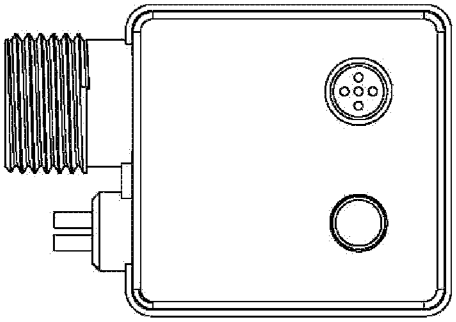
Figure 14C:
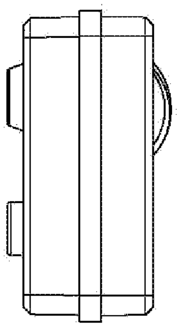
Figure 14D:
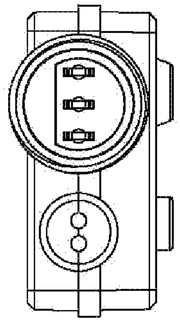
Figure 14E:
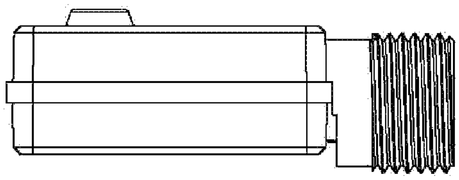
Figure 14F:
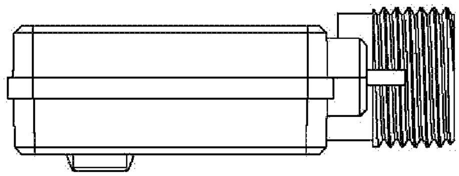
Figure 15A:
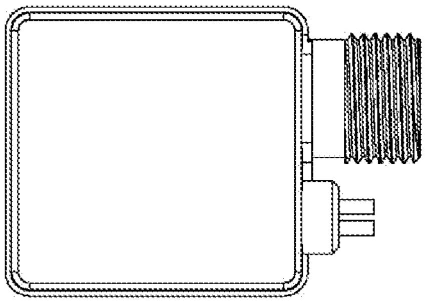
FIGS. 15A to 15F are regular hexahedron projection views of a twelfth lamp controller according to the present disclosure.
Figure 15B:
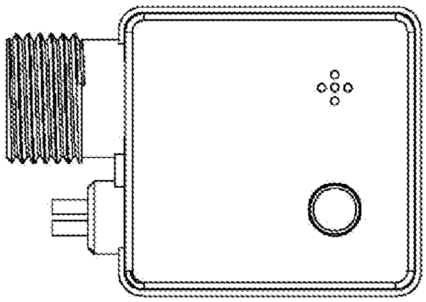
Figure 15C:
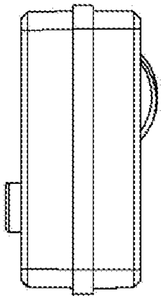
Figure 15D:
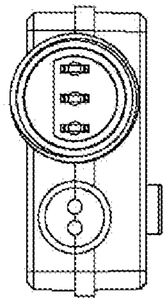
Figure 15E:
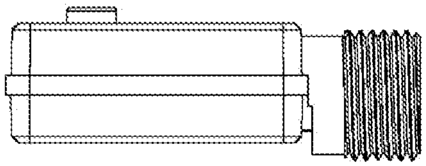
Figure 15F:
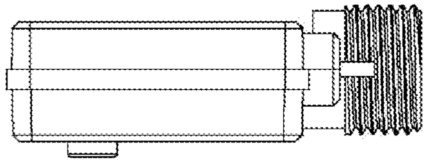
Figure 16A:
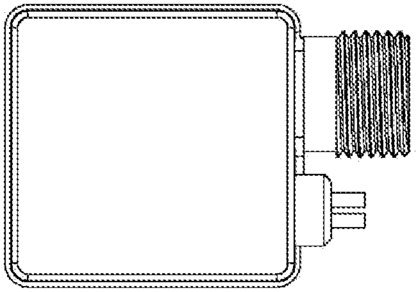
FIGS. 16A to 16F are regular hexahedron projection views of a thirteenth lamp controller according to the present disclosure.
Figure 16B:
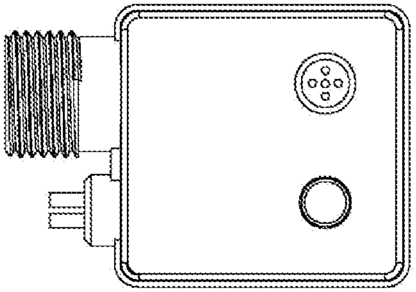
Figure 16C:
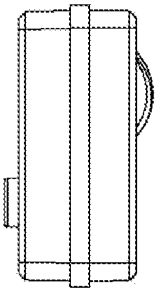
Figure 16D:
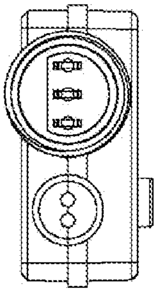
Figure 16E:
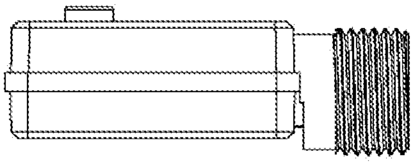
Figure 16F:
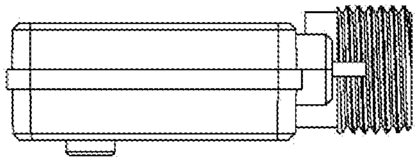
Figure 17A:
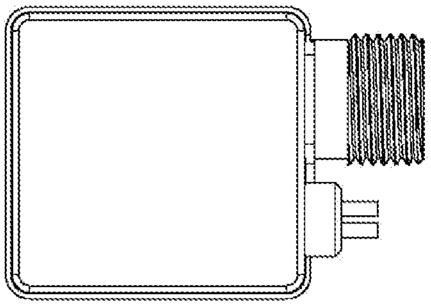
FIGS. 17A to 17F are regular hexahedron projection views of a fourteenth lamp controller according to the present disclosure.
Figure 17B:
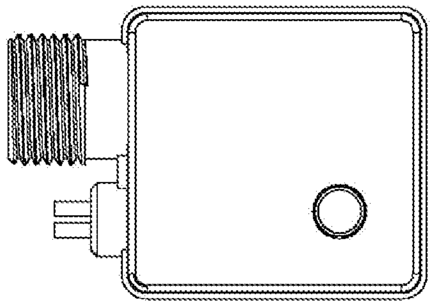
Figure 17C:
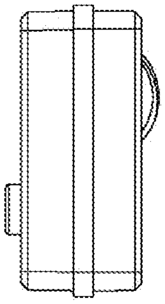
Figure 17D:
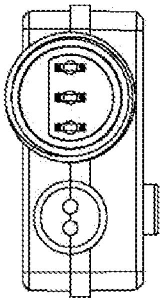
Figure 17E:
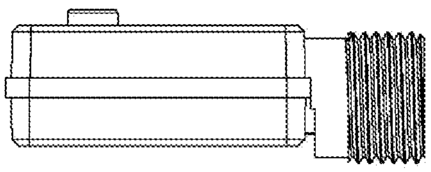
Figure 17F:
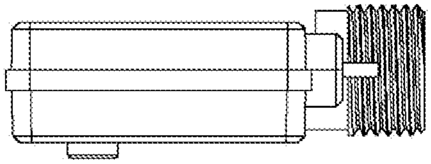
Figure 18A:
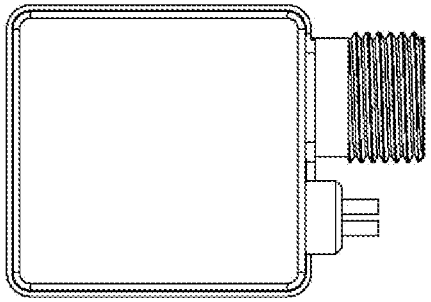
FIGS. 18A to 18F are regular hexahedron projection views of a fifteenth lamp controller according to the present disclosure.
Figure 18B:
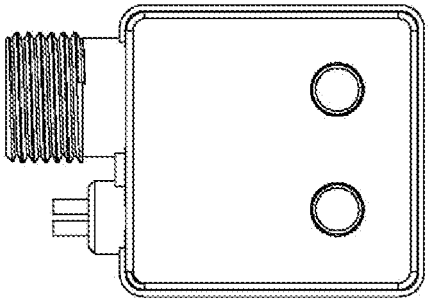
Figure 18C:
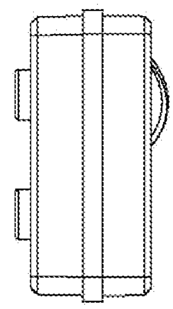
Figure 18D:
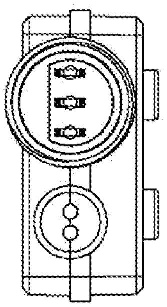
Figure 18E:
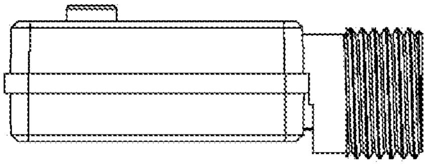
Figure 18F:
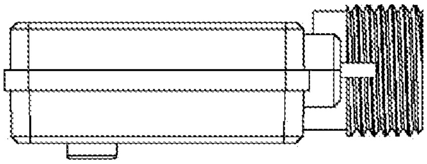

The difference between this embodiment and the first embodiment is as follows. As shown in FIGS. 3K and 3M, this embodiment uses three output connecting terminals 5 and three plug-in components 7. The three output connecting terminals 5 and the three plug-in components 7 are all arranged in a triangle. One of the output connecting terminals 5 has the same structure as the first embodiment, and the other two connecting terminals 5 comprise a first clip 5*a*, a second clip 5*b*, a connecting part 5*c* and an extension part 5*e*. One end of the first clip 5*a* is connected with one end of the connecting part 5*c*. The other end of the connecting part 5*c* is connected with one end of the second clip 5*b*. A clearance space 5*d* is formed between the first clip 5*a* and the second clip 5*b*. The other end of the first clip 5*a* is fixed with the circuit board 1. The other end of the second clip 5*b* is not connected with the circuit board 1. A yielding space is formed between two output connecting terminals 5. The extension part 5*e* is fixed with the first clip 5*a*. The extension part 5*e* is integrally formed with the first clip 5*a*. The extension part 5*e* is fixed with the circuit board 1. The extension part 5*e* is provided with a pin for welding, through which the extension part is welded and fixed with the circuit board 1. The plug-in socket 6 is fixed with the upper housing 10 or the lower housing 11. The output plug-in component 7 is connected with the output connecting terminal 5 after being inserted into the clearance space 5*d*. The output plug-in component 7 generates expansion force on the first clip 5*a* and the second clip 5*b* after being inserted into the clearance space 5*d*.

Through the formed yielding space, there will be no interference when the plug-in component 7 is connected with the output connecting terminals 5. Especially when three output connecting terminals 5 are connected with three plug-in components 7, when one of the plug-in components 7 passes through the yielding space between two connecting terminals 5, the plug-in component 7 can be prevented from interfering with two output connecting terminals 5 arranged on both sides, thus increasing the convenience of assembly.

The middle of the second clip 5*b* is formed with a recess part 5*f* which is concave to the inside of the clearance space 5*d*. The concave part 5*f* further yields to the plug-in component 7 located in the middle, thus reliably ensuring that there is no interference problem. The extension part 5*e* is curved. For example, the extension part 5*e* is hook-like. The extension part 5*e* gets around to the front of the yield opening 1*a*.

In addition, in order to understand the structure of the present disclosure more clearly, that is, various input modes and output modes described above (mainly referring to the output plug-in component 7), more drawings are provided, specifically as shown in FIG. 4A to FIG. 18F.

What is claimed is:

1. A lamp controller, comprising a circuit board (1), a main housing (2), a plug-in socket (6) and an output plug-in component (7), wherein the main housing (2) consists of an upper housing (10) and a lower housing (11), the upper housing (10) and/or the lower housing (11) are provided with cavities (12), after the upper housing (10) and the lower housing (11) are combined, an accommodating cavity for assembling the circuit board (1) is formed between the upper housing (10) and the lower housing (11), the axial direction of the plug-in socket (6) is not parallel to the longitudinal direction of the main housing (2), and the output plug-in component (7) is fixed with the plug-in socket (6), wherein the controller further comprises an output connecting terminal (5), the output connecting terminal (5) is fixed on the circuit board (1), the circuit board (1) is provided with a yielding opening (1*a*), a part of the output plug-in component (7) is located in the cavity (12) of the upper housing (10) or the lower housing (11), after the plug-in socket (6) is fixed with the main housing (2), when the circuit board (1) is assembled into the cavity (12) of the upper housing (10) or the lower housing (11), the output connecting terminal (5) is connected with the output plug-in component (7) again after the end of the output plug-in component (7) passes through the yielding opening (1*a*) on the circuit board (1);

the length of the yielding opening (1*a*) is greater than or equal to the length of the part of the output plug-in component (7) located in the cavity (12), and one end of the output plug-in component (7) passes through the yielding opening (1*a*) during the longitudinal movement of the circuit board (1) along the upper housing (10) or the lower housing (11); and alternatively, the length of the yielding opening (1*a*) is less than or equal to the length of the part of the output plug-in component (7) located in the cavity (12), so that the circuit board (1) is inclined to the upper housing (10) or the lower housing (11) and moves to connect the output connecting terminal (5) with the output plug-in component (7).

2. The lamp controller according to claim 1, wherein the plug-in socket (6) is integrally formed with the upper housing (10) or the lower housing (11).

3. The lamp controller according to claim 2, wherein the upper housing (10) is integrally formed with a first convex part (10*a*) located outside the cavity (12), the lower housing (11) is formed with a first fitting groove (11*a*), the first convex part (10*a*) is located on the end face covering the lower housing (11), the first fitting groove (11*a*) is located on the end face covering the upper housing (10), the first fitting groove (11*a*) is fitted with the first convex part (10*a*), and the plug socket (6) is integrally formed with the convex part (10*a*).

4. The lamp controller according to claim 1, wherein the output connecting terminal (5) moves along the longitudinal direction of the output connecting terminal (5), so that the output connecting terminal (5) and the output plug-in component (7) are plugged or clamped.

5. The lamp controller according to claim 1, further comprising a power connecting terminal (9), wherein the upper housing (10) and/or the lower housing (11) are provided with a clamping component (15) located outside the cavity (12), the clamping component (15) is provided with a neck (16), and a part of the power connecting terminal (9) is fitted with the neck (16).

6. The lamp controller according to claim 1, wherein the output connecting terminal (5) comprises a first clip (5*a*), a second clip (5*b*) and a connecting part (5*c*), one end of the first clip (5*a*) is connected with one end of the connecting part (5*c*), the other end of the connecting part (5*c*) is connected with one end of the second clip (5*b*), a clearance space (5*d*) fitted with the output plug-in component (7) is formed between the first clip (5*a*) and the second clip (5*b*), the other end of the first clip (5*a*) is fixed with the circuit board (1) and located at one side of the yielding opening (1*a*), the other end of the second clip (5*b*) is fixed with the circuit board (1) and located at the other side of the yielding opening (1*a*), the clearance space (5*d*) corresponds to the yielding opening (1*a*), the output plug-in component (7) generates expansion force on the first clip (5*a*) and the second clip (5*b*) after being inserted into the clearance space (5*d*) along the longitudinal direction of the clearance space (5*d*).

7. The lamp controller according to claim 6, wherein the other ends of the first clip (5*a*) and the second clip (5*b*) are bent to the outside of the clearance space (5*d*).

8. The lamp controller according to claim 1, wherein the circuit board (1) is provided with a voice control mode input unit (17) for receiving external ambient sound, the upper housing (10) or the lower housing (11) is provided with a channel (18) through which external ambient sound reaches the voice control mode input unit (17), and the channel (18) is fitted with the voice control mode input unit (17).

9. A lamp controller, comprising a circuit board (1), a main housing (2), a plug-in socket (6) and an output plug-in component (7), wherein the main housing (2) consists of an upper housing (10) and a lower housing (11), the upper housing (10) and/or the lower housing (11) are provided with cavities (12), the upper housing (10) is fixed with the lower housing (11), the axial direction (X) of the plug-in socket (6) is not parallel to the longitudinal direction (Y) of the main housing (2), and the output plug-in component (7) is fixed with the plug-in socket (6), wherein a part of the output plug-in component (7) is located in the cavity (12) of the upper housing (10) or the lower housing (11); the controller further comprises at least two output connecting terminals (5), the at least two output connecting terminals (5) comprise a first clip (5*a*), a second clip (5*b*), a connecting part (5*c*), and an extension part (5*e*), one end of the first clip (5*a*) is connected with one end of the connecting part (5*c*), the other end of the connecting part (5*c*) is connected with one end of the second clip (5*b*), a clearance space (5*d*) is formed between the first clip (5*a*) and the second clip (5*b*), the other end of the first clip (5*a*) is fixed with the circuit board (1), the other end of the second clip (5*b*) is not connected with the circuit board (1), a yielding space is formed between two output connecting terminals (5), the extension part (5*e*) is fixed with the first clip (5*a*), and the extension part (5*e*) is fixed with the circuit board (1); the plug-in socket (6) is fixed with the upper housing (10) or the lower housing (11), and the output plug-in component (7) is connected with the output connecting terminal (5) after being inserted into the clearance space (5*d*).

* * * * *